Dec. 31, 1957  R. E. BROOKS  2,818,158
FEEDING DEVICE FOR WALNUT HALVING MACHINES
Filed Sept. 7, 1954  4 Sheets-Sheet 1

INVENTOR
Robert E. Brooks
BY Webster & Webster
ATTORNEYS

Dec. 31, 1957  R. E. BROOKS  2,818,158
FEEDING DEVICE FOR WALNUT HALVING MACHINES
Filed Sept. 7, 1954  4 Sheets-Sheet 2

INVENTOR
*Robert E. Brooks*
BY
*Webster & Webster*
ATTORNEYS

Dec. 31, 1957  R. E. BROOKS  2,818,158
FEEDING DEVICE FOR WALNUT HALVING MACHINES
Filed Sept. 7, 1954  4 Sheets-Sheet 3

INVENTOR
Robert E. Brooks
BY Webster & Webster
ATTORNEYS

Dec. 31, 1957 R. E. BROOKS 2,818,158
FEEDING DEVICE FOR WALNUT HALVING MACHINES
Filed Sept. 7, 1954 4 Sheets-Sheet 4

INVENTOR
*Robert E. Brooks*

BY *Webster & Webster*
ATTORNEYS

United States Patent Office 2,818,158
Patented Dec. 31, 1957

2,818,158
FEEDING DEVICE FOR WALNUT HALVING MACHINES

Robert E. Brooks, Stockton, Calif.

Application September 7, 1954, Serial No. 454,268

9 Claims. (Cl. 198—33)

The present invention is directed to, and it is a major object to provide, a novel device adapted to feed walnuts singly but successively in predetermined timed relation to a walnut halving machine of the circular saw type, such as is illustrated in my copending application, Serial No. 342,240, filed March 13, 1953, now Patent No. 2,722,253.

In such a walnut halving machine the walnuts are individually engaged and supported from opposite sides by cam-advanced soft rubber cups mounted in connection and traveling with an endless driven chain assembly; the walnuts thus being disposed and moving in single file to a circular saw which severs the walnuts in half, to the end that the meats may subsequently be readily removed from said halves. For the best results the walnuts must be supported with their major axis extending in the direction of travel and disposed with the suture substantially horizontal; this to the end that when the circular saw severs each walnut in half the cut is made at a right angle to the suture, and consequently between the meat halves. When walnuts are so severed the meat halves are—in the main—removable whole, which greatly enhances their commercial value.

It is therefore another important object of this invention to provide a novel walnut feeding device which, while advancing the walnuts in single-file order, first properly orients each walnut; i. e., so that its major axis is longitudinal with the suture substantially horizontal, and secondly feeds the walnuts in such position one at a time into the walnut halving machine at the receiving end thereof and in timed relation to operation of the latter.

An additional object of the invention is to provide a walnut feeding device, as above, which includes a novel walnut orienting assembly through which the walnuts are advanced by a timed power actuated plunger; and a novel walnut receiving and transfer conveyor interposed between such walnut orienting assembly and the walnut halving machine.

It is also an object of the invention to provide a walnut feeding device, for the purpose described, which is designed for ease and economy of manufacture; simplicity of operation; and long service, with a minimum of maintenance or repair being required.

Still another object of the invention is to provide a practical and reliable walnut feeding device, and one which will be exceedingly effective for the puropse for which it is designed.

These objects are accomplished by means of such structure and relative arrangement of parts as will fully appear by a perusal of the following specification and claims.

Figure 1:
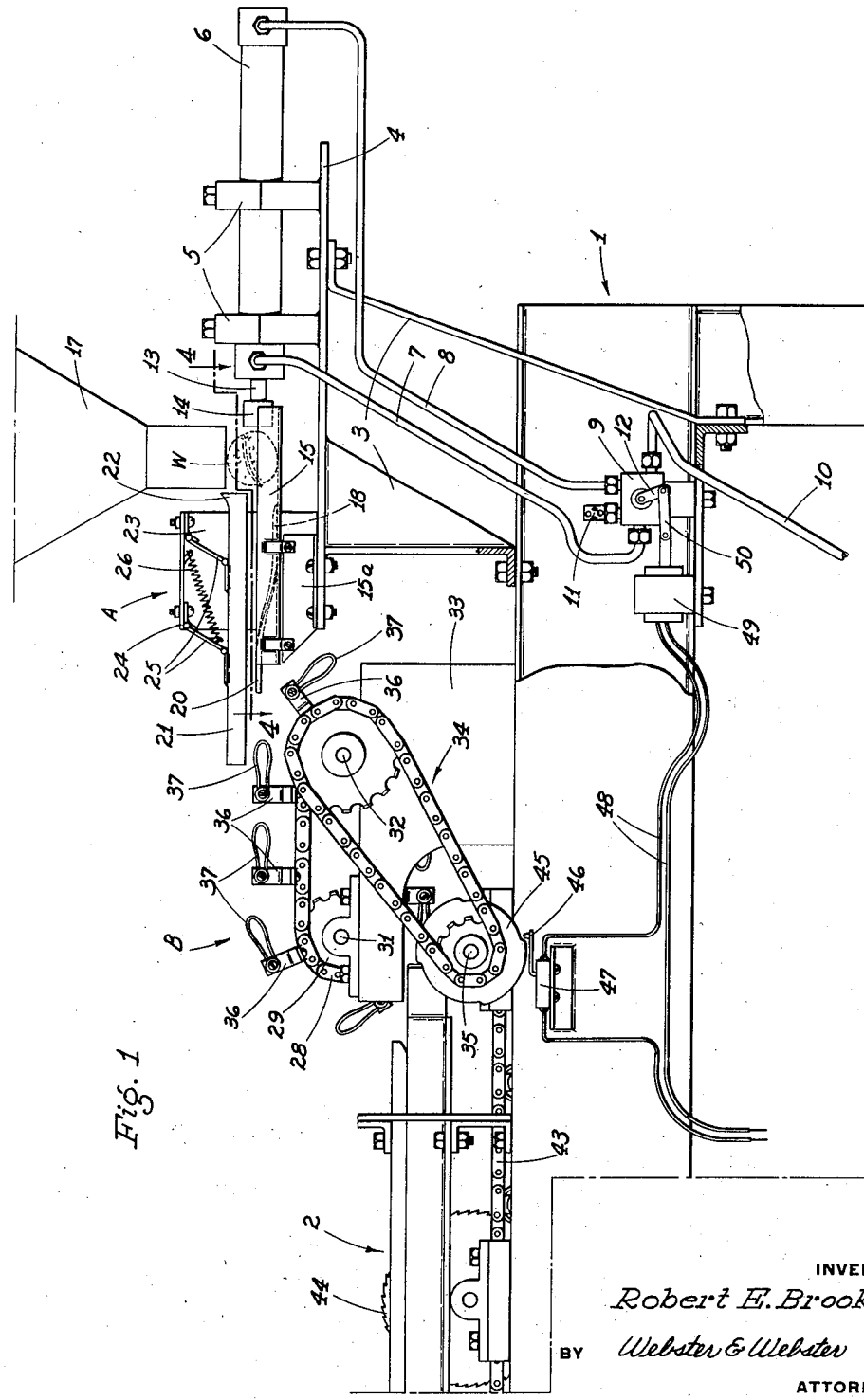
Fig. 1 is a side elevation of the walnut feeding device as mounted in connection and for cooperation with a walnut halving machine; the latter being shown only in part.

Referring now more particularly to the drawings and to the characters of reference marked thereon, the novel feeding device, for walnut halving machines, comprises an upstanding longitudinal main frame, indicated generally at 1, which main frame may be a lengthwise extension of the frame of a circular-saw type walnut halving machine, indicated generally and shown only in part at 2.

Above the outer end portion of the main frame 1 it supports, by means of a structure 3, an elevated longitudinal platform 4. In turn the outer end portion of the platform 8 is fitted with spaced clamping blocks 5 which secure a horizontal, longitudinally extending power cylinder 6 in place; such power cylinder being of double-acting type. The power cylinder 6 is preferably operated by air pressure through the medium of pipes 7 and 8 which lead from opposite ends of said cylinder to a four-way reversing valve 9; such valve being supplied with air pressure through pipe 10, while the valve vents as at 11. By to and fro swinging of the lever arm 12 the valve 9 is reversed, causing operation of the power cylinder 6 in one direction or the other. The manner in which the lever arm 12 is controlled will hereinafter appear.

The double-acting or reversible power cylinder 6 includes a forwardly projecting piston rod 13 having a plunger head 14 on its outer end.

A longitudinal, upwardly opening half circle trough 15 is supported horizontally above the platform 4 by a web 15a; such trough being disposed so that the plunger head 14, upon advance of the piston rod 13, may work lengthwise through such trough in coaxial relation but with a space existing between said plunger head and the inner surface of such trough. The trough 15 is one element of a walnut orienting and advancing assembly, indicated generally at A.

Figure 4:
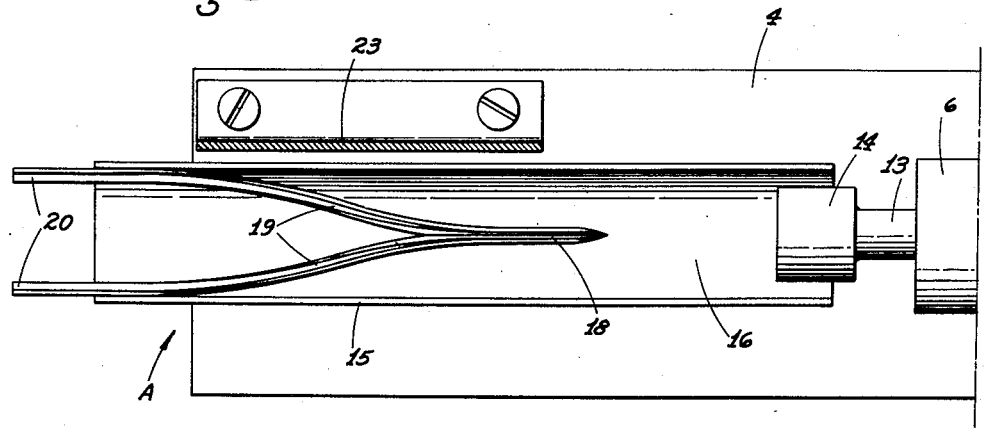
Fig. 4 is an enlarged fragmentary sectional plan taken on line 4—4 of Fig. 1.

The piston rod 13, for each cycle of operation, is initially retracted, as in Figs. 1 and 4, with the plunger head 14 disposed in the immediate rear end portion of the trough 15; the area of such trough directly ahead of the initially retracted plunger head 14 forming a walnut receiving zone 16 into which walnuts—one of which is shown at W—are adapted to be deposited one at a time from a hopper 17.

Ahead of the walnut receiving zone 16 the trough 15 is formed, centrally in the bottom, with a short, longitudinal, upstanding rider strip 18, which strip—at its forward end—separates into two guide ribs 19. From the point of separation the guide ribs 19 extend forwardly and upwardly, in divergent relation, on the inner surface of the trough on an elongated or slow spiral through approximately 90°. As the ribs 19 reach the forward end of the trough 15 they are at the upper edges thereof, and thence project horizontally forwardly therefrom, in parallelism, as at 20, to form a rest.

A longitudinal, downwardly opening, half-circle nut hold-down channel 21 is mounted, in vertically yieldable relation, in alinement with, but spaced above, the trough 15; the rear end of the hold-down channel 21 flaring outwardly, as at 22, and being disposed generally above the rider strip 18. At its forward end the hold-down channel 21 projects some distance ahead of the forward end portions 20 of ribs 19.

The mount for the vertically yieldable hold-down channel 21 comprises a laterally offset upstanding bracket plate 23 secured, at its lower end, to the platform 4, and at its upper end having an overhanging top plate 24.

Forwardly and downwardly inclined suspension arms 25 are pivotally connected in parallelism between the top plate 24 and the hold-down channel 21; such arms normally but yieldably being urged in a rearward direction by a tension spring 26.

After each walnut W is deposited in the walnut receiving zone 16 of trough 15 the power cylinder is actuated through a cycle which first advances the piston rod 13 and plunger head 14 through the trough 15, and then retracts said rod and head. As the piston rod 13 and plunger head 14 advance, the walnut W in the receiving zone 16 is engaged and pushed forward in the trough 15; the walnut first being carried on the rider strip 18 and then being engaged in supported relation by the guide ribs 19.

Figure 3:
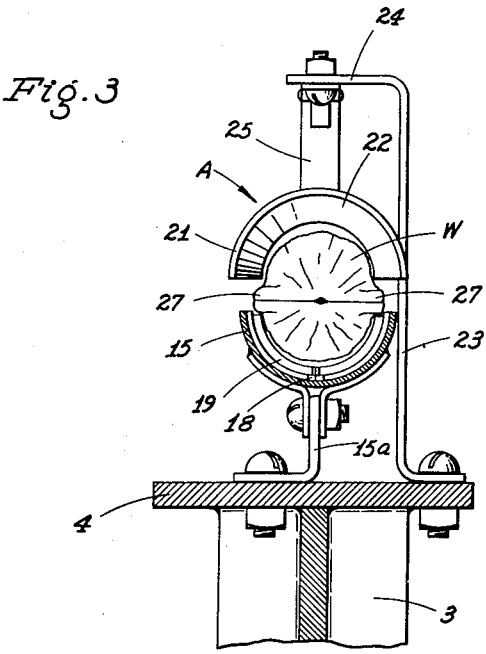
Fig. 3 is an enlarged fragmentary transverse section on line 3—3 of Fig. 2.

As the walnut W continues its advance on said guide ribs, the same engage beneath the walnut suture 27 on one side or the other, with the result that continued motion of the walnut ultimately brings it to a position with the suture on both sides of the walnut riding the related ribs 19, with the major axis of the walnut extending lengthwise of the direction of travel (see Fig. 3).

At the end of the forward stroke of the piston rod 13 and the plunger head 14, the walnut W—oriented as above described—is disposed on and supported by the projecting forward end portions 20 of the ribs 19.

During its course of travel in the trough 15 the walnut is held down under pressure from above by the hold-down channel 21; the flared rear end of said channel assuring of easy and initial entry of the walnut W into such channel. After the walnut W is deposited on the projecting forward end portions 20 the piston rod 13 and plunger head 14 are retracted, by reversal of the power cylinder 6, to their initial starting position.

Each oriented walnut W is transferred from the projecting forward end portions 20 of ribs 19 to the walnut halving machine 2 by means of a walnut receiving and transfer conveyor, indicated generally at B, and which is constructed as follows:

A longitudinally extending, endless chain 28 is disposed vertically between the walnut orienting and advancing assembly A and the walnut halving machine 2; such endless chain being carried on sprockets 29 and 30 fixed on cross shafts 31 and 32 suitably journaled in connection with transversely spaced mounting plates 33 which upstand from the main frame 1.

The endless chain 28 is driven, with its upper run moving forwardly, by means of an endless chain and sprocket unit, indicated generally at 34; such unit connecting between the cross shaft 32 and a driven cross shaft 35 which is included in the adjacent and walnut receiving end of the walnut halving machine 2.

The endless chain 28 is fitted throughout its length with a plurality of equally longitudinally spaced short posts 36 fixed to, and radiating from, certain links of said chain. A pair of transversely spaced, spring fingers 37 of elongated loop form are fixed to the outer end of each post 36 and project rearwardly in right angle relationship thereto.

Figure 2:
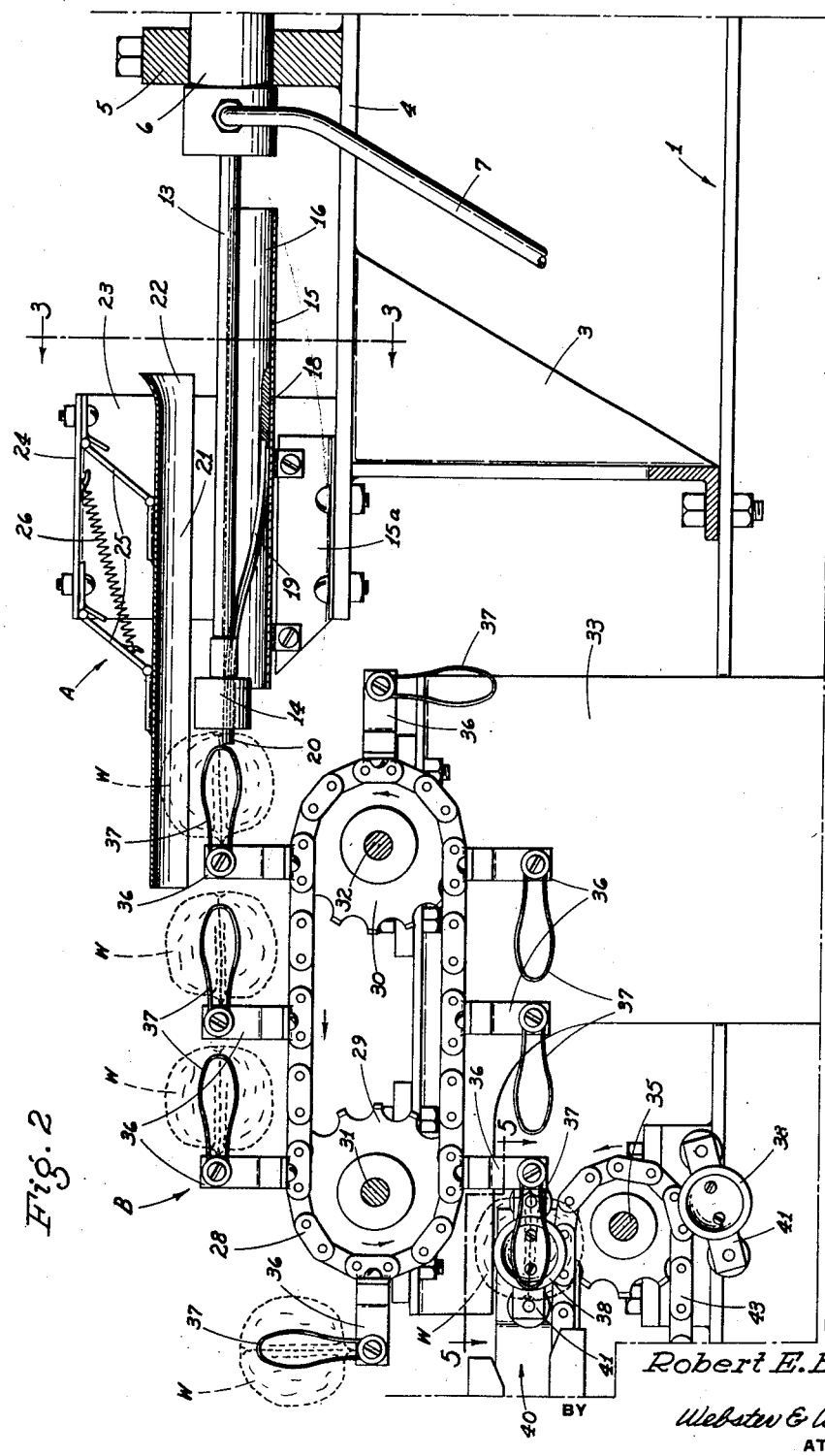
Fig. 2 is an enlarged fragmentary sectional elevation of the walnut feeding device showing particularly the walnut orienting assembly, and the walnut receiving and transfer conveyor; the adjacent or receiving end of the walnut halving machine, which is shown only in part, likewise being in section.

The endless chain 28, posts 36, and pairs of spring fingers 37 are arranged so that when each such post 36 moves into the upper run of said chain at the rear end of said run the spring fingers frictionally engage opposite sides of the walnut W supported on the projecting forward end portions 20 of the ribs 19. As each walnut W is thus frictionally engaged between a pair of the spring fingers 37, such nut is carried forwardly out of the walnut orienting and advancing assembly 8, and moves with the endless chain 28. The fingers 37 then face to the rear. See Fig. 2.

Each walnut W, as engaged between a pair of spring fingers 37, is advanced without disturbing the previous orientation; i. e., each walnut lies with its major axis lengthwise of the direction of travel, and with the suture disposed at the sides.

The walnuts W each remain between the engaging pair of spring fingers 37 until the related post 36 first enters the lower run of the endless chain 28 and at which time such post is vertically dependent, with the spring fingers projecting in a forward direction. See Figs. 2 and 5. At such time the walnut is engaged and supported between a pair of opposite, soft rubber cups 38 which are urged into contact with the walnut by plungers 39 actuated by cam means, indicated generally at 40.

Figure 5:
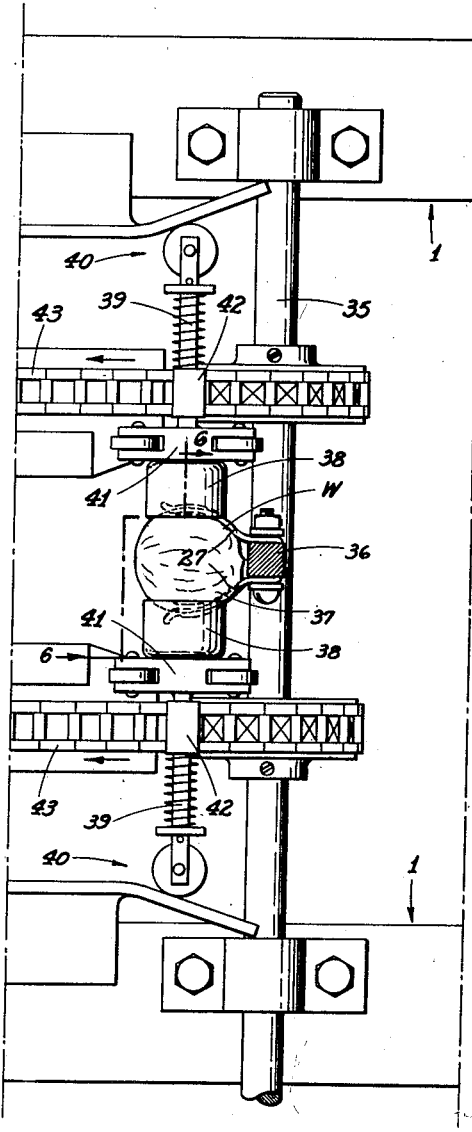
Fig. 5 is a fragmentary sectional plan view, of the receiving end of the walnut halving machine, taken on line 5—5 of Fig. 2.

The opposed soft rubber cups are carried on tandem guide roller units 41 on the inner ends of the plungers 39; the latter being journaled in guide blocks 42 on transversely spaced, endless chains 43 of the walnut halving machine, which chains move in the direction indicated by the arrow in Fig. 5.

Figure 6:
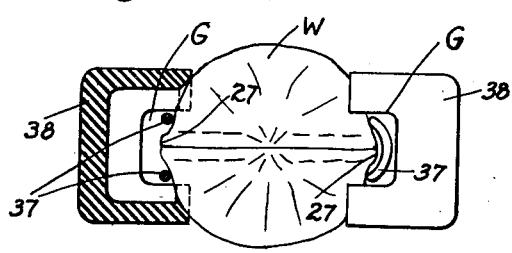
Fig. 6 is a fragmentary enlarged cross section on line 6—6 of Fig. 5.

Upon each walnut W being engaged between a pair of the opposed rubber cups 38, and which occurs when said cups first enter the upper run of the endless chains 43, the walnut is then carried forward between such cups, whereas the related pair of spring fingers 37—moving rearwardly with the lower run of endless chain 28—strip from between the cups 38 and supported walnut. The fingers are enabled to strip from the nuts as above stated because said fingers are relatively narrow in a vertical plane so that the nut engaging portion of the fingers are inside the cups, while the cups engage the nut to the sides of the fingers, as indicated in Fig. 6. Nothing therefore prevents the nuts being pulled from the fingers as said fingers and cups move lengthwise apart, the cups having greater frictional contact with the nuts than the fingers. Since the cups may have opposed grooves G therein to clear the end portions of the fingers, said fingers have no contact with the cups at any time. Even if the grooves are omitted, the soft rubber of the cups offers little resistance to the stripping of the fingers from the nuts, since the cups in any case would only engage the fingers at their ends. Each walnut is thus effectively transferred to the walnut halving machine 2, with such walnut still remaining in proper orientation; i. e., with the major axis of the walnut lengthwise of the direction of travel, and with the suture horizontal. Thus, as each walnut is carried forward in the walnut halving machine 2 between a pair of the rubber cups 38, such walnut is severed at a right angle to the suture by the circular saw 44 which such halving machine 2 includes.

It is of course to be recognized that the reversible power cylinder 6 of the walnut orienting and advancing assembly A, and the endless chain 28 of the walnut receiving and transfer conveyor B must be operated in timed relation to each other, and to the operation of the walnut halving machine 2.

The power cylinder 6 is reversibly actuated—i. e. carried through each cycle in proper timed relation—by means of a timing cam 45 on one of the cross shafts, here shown as the cross shaft 35. The timing cam 45 has a plurality of lobes which recurringly work the control arm 46 of a switch 47 in an energizing circuit 48 which leads to a spring return type solenoid 49; the latter being connected by linkage 50 with the lever arm 12 of the reversing valve 9.

The arrangement is such that with recurrent closing and opening of the switch 47 by the timing cam 45, the solenoid 49 works the reversible valve 9 in a manner to cause proper cycling in timed relation of the power cylinder 6. The timing of the walnut receiving and transfer conveyor B is directly controlled by the relative sprocket diameters of the endless chain and sprocket unit 34.

With the above described feeding device, walnuts are fed individually, yet successively in proper timed relation, to the walnut halving machine 2; the walnuts being effectively oriented before their delivery to said machine for severing into halves by the circular saw 44.

The machine functions smoothly, positively, and effectively to accomplish the desired orientation of the walnuts and their feeding to the walnut halving machine 2 in the manner described.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired.

1. A walnut orienting and advancing device comprising a support adapted for movement of a walnut therealong from one point to another, means to impart such movement to a walnut initially disposed at said one point, means associated with the support operative in engagement with the moving walnut to cause the same to be oriented to dispose its suture in a predetermined position upon the walnut reaching said other point, the support being a longitudinal trough, and hold-down means yieldably engaging the moving walnut from above and while engaged with the orienting means; the walnut orienting means being disposed in the trough.

2. A feeding device for a walnut halving machine which includes an endless conveyor having walnut gripping means thereon in circumferentially spaced relation and each being operative automatically to grip a walnut at a predetermined position adjacent the rear end of the machine, said device comprising a walnut orienting and advancing assembly and a transfer conveyor mounted longitudinally in spaced relation rearwardly of said rear end of the machine, such assembly including a longitudinal support adapted for movement of a walnut therealong from the rear end to the forward end thereof, means included with the assembly to impart such movement to a walnut initially disposed at said rear end of the support, and means mounted on the support to engage the moving walnut and cause the same to be oriented to dispose its suture in a predetermined position upon the walnut reaching the forward end of the support; said conveyor including means operative to engage walnuts one at a time from the forward end of said assembly and to transfer the walnuts individually to said gripping means successively and while maintaining said orientation of the walnuts; and means connecting the assembly and conveyor for operation in timed relation.

3. A feeding device, as in claim 2, in which the walnut advancing and orienting assembly includes transversely spaced ribs which project forwardly from the support and provide a rest fo reach walnut at said other point; the walnut receiving and transfer conveyor including a longitudinally extending endless chain, posts fixed on and projecting from the chain at circumferentially spaced points, the endless chain having a run which moves away from said assembly and toward the machine, and a pair of transversely spaced spring fingers fixed on each post and projecting rearwardly therefrom relative to the direction of travel; each pair of spring fingers sweeping adjacent said rest and picking up the walnut therefrom and for subsequent travel with the endless chain, there being yieldable hold-down means engaging the walnut from above while on the rest, and the spring fingers frictionally engaging the walnut on opposite sides upon movement thereto from below.

4. A feeding device, as in claim 3, in which the walnut gripping means each include opposed, initially separate cam actuated cups of soft rubber, said cups being operative to close on a walnut at said predetermined position; the pairs of spring fingers on said endless chain successively delivering the walnuts individually to said predetermined position for transfer to the related cups upon closing thereof.

5. A walnut orienting and advancing device comprising a longitudinal support adapted for movement of a walnut therealong from the rear to the forward end thereof, means to engage and advance a walnut along the support, nut orienting means on the support including diverging ribs extending lengthwise of the support arranged to engage the suture of a nut as the latter is moved along the support and dispose such suture in a longitudinal horizontal plane upon the nut reaching a point adjacent the forward end of the ribs, and movable gripping means to engage the nut when the latter is thus oriented and still on the ribs and advance the nut a predetermined distance beyond the forward end of the ribs and support.

6. A device, as in claim 5, in which the gripping means comprises laterally opposed spring fingers to frictionally engage and support the nut on the sutured side thereof; said fingers having longitudinal openings through which the nut suture projects in clearance relation.

7. A device, as in claim 6, with yieldable hold-down means mounted in connection with the support engaging the rib-engaged nut at a point substantially 90° from the nut suture and maintaining such engagement until the nut is gripped by said gripping means.

8. A walnut orienting and advancing device comprising a longitudinal support adapted for movement of a walnut therealong from the rear to the forward end thereof, nut orienting means on the support including laterally diverging ribs extending lengthwise of the support and arranged to engage the suture of a nut as the latter is moved along the support and dispose such suture in a longitudinal horizontal plane upon the nut reaching a position adjacent the forward end of the ribs, nut gripping means comprising laterally opposed spring fingers arranged to frictionally engage and support the nut lengthwise adjacent the suture thereof, means mounting the fingers for movement in a direction lengthwise of and away from the ribs so that in one position the fingers are disposed adjacent and ahead of the forward end of the ribs and in substantial alinement with the suture of a nut disposed on the ribs at their forward end, and means to advance the nut along the support and acting in timed relation with the movement of the fingers so that the nut will be pushed from the ribs and between the fingers as the latter reach said one position.

9. In a device to feed walnuts to a halving machine which includes an endless conveyor having a run movable in one direction and an opposed pair of gripping cups on the conveyor arranged to approach each other and frictionally engage and hold a nut on opposite sides upon the cups reaching a predetermined position on said run with movement of the conveyor; an endless conveyor having a run movable in a direction opposite that of the run of the first named conveyor, and overlying the same at one end, and a pair of opposed spring fingers supported by said run of the feed conveyor and between which a walnut to be fed is held, said fingers projecting rearwardly relative to the direction of travel of the run; the run of the feed conveyor being disposed so that the nut held by the fingers will be in position for engagement by the cups when the latter reach said position and so that the fingers are substantially parallel to said run of the first named conveyor; the cups being of yieldable material and of such size relative to the width of the fingers that the cups at their periphery surround the major portion of the fingers when said cups are engaged with the nut, and said cups engaging the nut with greater frictional pressure than the fingers whereby to cause the nut to be stripped from the fingers upon movement of the conveyor runs in opposite directions.

References Cited in the file of this patent

UNITED STATES PATENTS

| | | |
|---|---|---|
| 1,722,673 | Nevala | July 30, 1929 |
| 1,992,347 | Bartlett | Feb. 26, 1935 |
| 2,067,566 | Field | Jan. 12, 1937 |
| 2,167,676 | Pechy | Aug. 1, 1939 |
| 2,420,659 | Ewald et al. | May 20, 1947 |
| 2,702,112 | Hait | Feb. 15, 1955 |
| 2,769,521 | Hait | Nov. 6, 1956 |